J. G. BARNSDALE.
METHOD AND MEANS FOR APPLYING MOTIVE POWER TO VEHICLES.
APPLICATION FILED APR. 7, 1921.
1,413,955.
Patented Apr. 25, 1922.
2 SHEETS—SHEET 1.
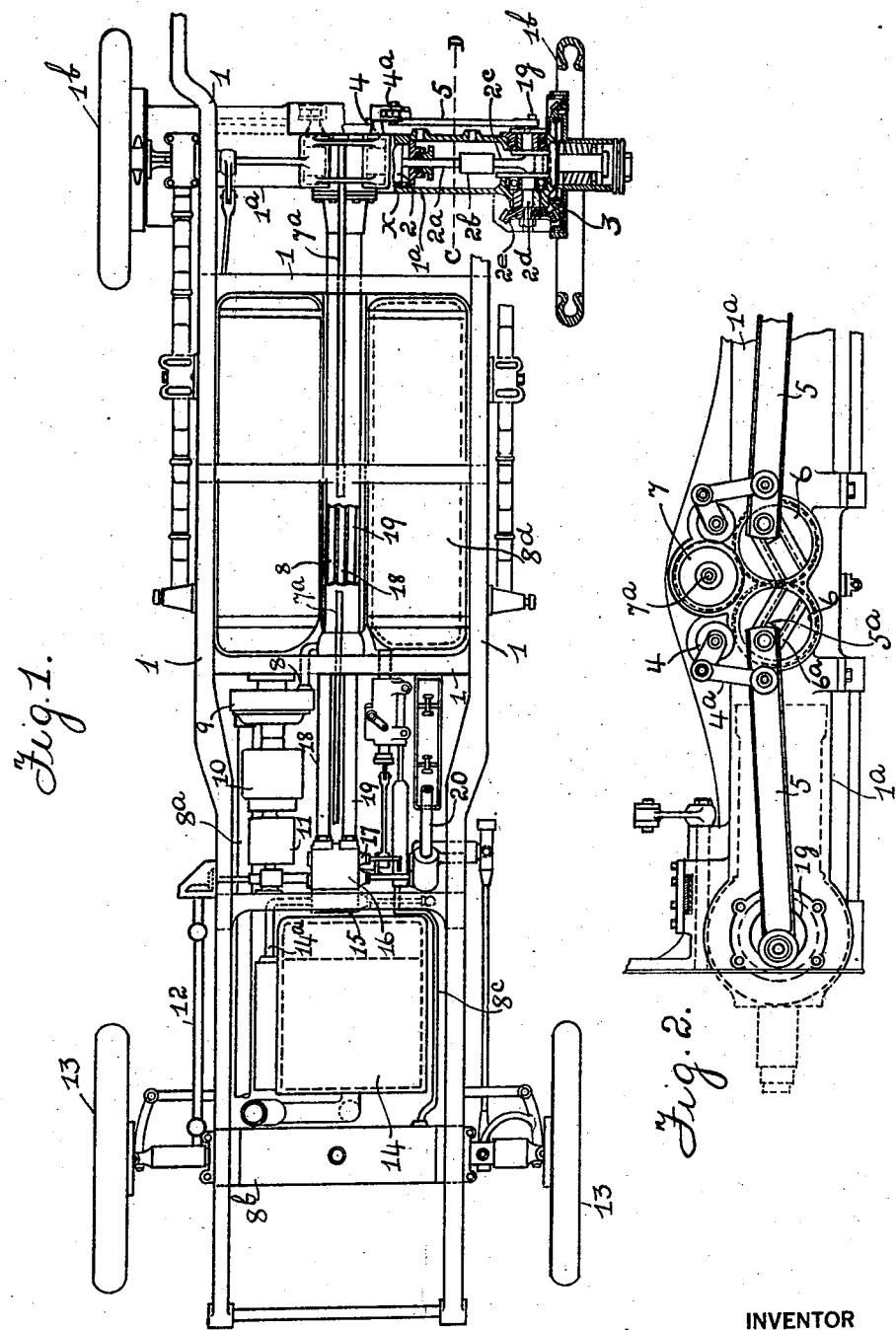
INVENTOR
John G. Barnsdale
BY James T. Watson
ATTORNEY

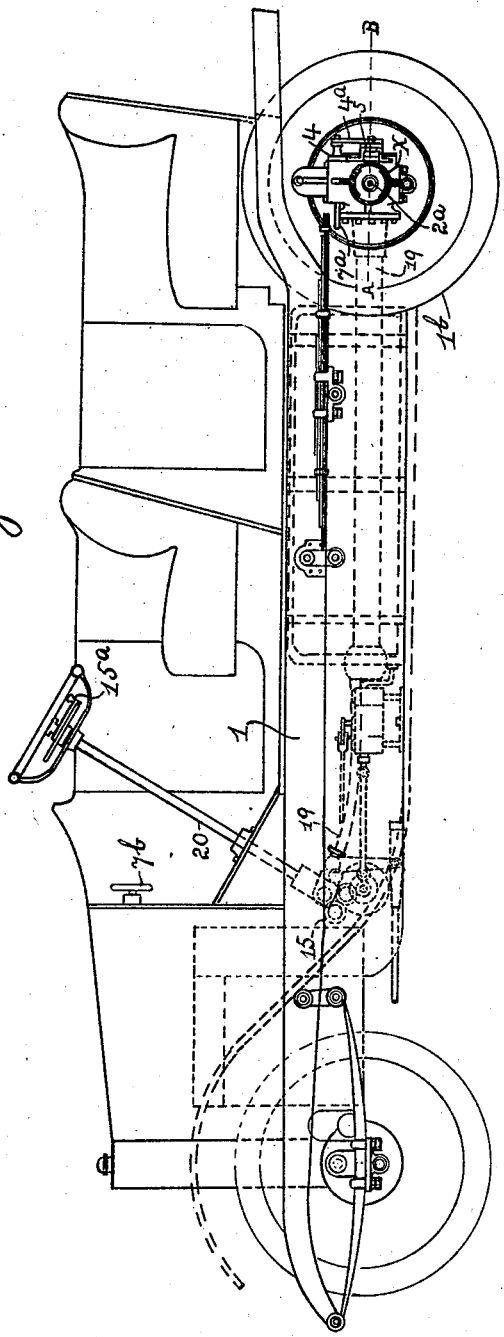

UNITED STATES PATENT OFFICE.

JOHN G. BARNSDALE, OF SUPERIOR, WISCONSIN.

METHOD AND MEANS FOR APPLYING MOTIVE POWER TO VEHICLES.

1,413,955. Specification of Letters Patent. Patented Apr. 25, 1922.

Application filed April 7, 1921. Serial No. 459,342.

*To all whom it may concern:*

Be it known that I, JOHN G. BARNSDALE, a citizen of the United States, residing at Superior, in the county of Douglas and State of Wisconsin, have invented certain new and useful Improvements in Methods and Means for Applying Motive Power to Vehicles, of which I do declare the following to be a specification.

My invention relates to automobiles, and has for its object the provision of an improved method and means of applying motive power to the drive wheels. It consists of the structures, combinations and arrangements of parts hereinafter described and claimed.

In the drawings, Fig. 1 is a top plan view, partly in horizontal section on the line A—B of Fig. 3, of the chassis of an automobile embodying my said invention. Fig. 2 is a fragmentary rear elevation of said automobile, and Fig. 3 is a side elevation partly in diagram and partly in section on the line C—D, of Fig. 1.

In the drawings, 1 is the frame of the vehicle, including a tubular rear axle $1^a$ mounted upon the drive wheels $1^b$. Said rear axle is adapted to contain, or operate, in part, as the piston cylinder or cylinders X of one or two reciprocating steam engines of any suitable structure positioned in said axle intermediate of the ends thereof. Said engines are oppositely positioned and each of them is adapted to operate a different one of the supporting rear drive wheels of the automobile. Said engines are similar and only one of them will therefore be extensively described in detail. Included in such engine is a piston 2, a piston rod $2^a$, a crosshead $2^b$, a connecting rod $2^c$, a crank shaft $2^d$, and a gear $2^e$, which gear is keyed to said crank shaft near the end of said axle and is adapted to mesh with a gear 3 secured to the adjacent drive wheel $1^b$.

Formed in said axle is a valve chamber for the valve 4, for the corresponding engine. Said valve is preferably of the cylindrical inside admission type and governs the flow of steam or power fluid to the piston cylinder. Said valve is operated by means of a crank stem $4^a$ pivotally connected to a reciprocable eccentric shaft 5 intermediate of the ends thereof. One end of said eccentric shaft is journalled on an eccentric, or crank arm $1^g$ on said crank shaft, and the opposite end of said eccentric arm is pivotally mounted upon a block $5^a$ which is adapted to slide in a diametrically extending guide $6^a$ formed upon or secured to the side of a normally stationary reversing gear 6, which gear is mounted upon said axle. The reversing gears of both engines preferably mesh with each other so that the rotation of one will rotate the other, thus making it unnecessary to provide separate operating pinions for each of said gears. A reversing gear pinion 7 engages one of said reversing gears and is keyed to a shaft $7^a$ which extends to a position adjacent to the steering wheel and is there connected in any suitable manner, or by any suitable transmission means with an operating hand wheel $7^b$ positioned on the dash board opposite the driver's seat. It will be observed that the operation of said hand wheel and reverse gear pinion will cause the partial rotation of said reverse gears 6, thus turning said guides to a different inclination or direction, which will operate to change the degree of inclination of said eccentric rod and cause it to change the elevation of said valve stem cranks whereby the valve will be either reversed, or the admission partly cut off, or further opened as the case may be, according to the prior position of the valve and the degree to which said guides are turned.

The exhaust from said piston cylinders is carried forward, by any suitable exhaust conduit, as 8, to and through a turbine engine 9 of any suitable construction and thence, as by a pipe $8^a$ (partly broken away), to the radiator or condenser $8^b$ at the forward end of said automobile, whence, in condensed form, it flows through any suitable conductor as pipe $8^c$ to the water supply tank $8^d$.

Said turbine is adapted to operate an electric generator 10 and an air compressor 11, and, preferably, an auxilliary drive 12 of any suitable structure for driving one of the front supporting wheels 13 of said vehicle.

A steam generator 14 of any suitable structure provides steam for said reciprocating engines through a throttle valve 15 of any suitable structure positioned near the drivers seat, said steam flowing from said generator to said throttle valve through any suitable channels, as through the pipe $14^a$ and from said throttle valve to said cylinder valves through any suitable chambers, valves, pipes or other or additional forms of conductors, as through the chambers 16 and 17, and pipes 18 and 19. Said throttle valve is preferably operated by a lever 15ª near the top of the steering wheel shaft 20, said lever being connected with said throttle by any suitable transmission extending through the steering wheel shaft.

The combination of the engines with the rear axle permits direct application of power to the rear wheels, eliminates many frictional transmission parts and parts that tend to work loose, and results in a considerable saving of weight, which is partially utilized for material improvement of other features. The structure is simple, effective and durable, and the repair and maintenance costs reduced to a minimum.

What I claim is—

1. The method of applying motive power to vehicles, which consists in locating a reciprocating engine within the rear axle of the vehicle, gearing the same to one of the rear supporting wheels, locating a turbine engine near the forward end of said vehicle and gearing the same to one of the forward supporting wheels, said turbine being adapted to be driven by exhaust steam from said reciprocating engine.

2. The combination with a vehicle provided with a rear axle and rear supporting wheels, of a reciprocating steam engine carried by said axle, the piston cylinder forming part of said engine being adapted to also form part of said axle, said engine being geared to one of said wheels, said engine including an intake valve, a cut-off and reverse gear for said valve, and an eccentric gear for operating said valve.

3. The combination with a vehicle provided with a rear axle and rear supporting wheels, of two reciprocating steam engines carried by said axle, the piston cylinders forming parts of said engines being adapted to also form parts of said axle, said engines being geared to opposite ones of said rear wheels respectively, each of said engines including an intake valve, a cut-off and reversing gear, and an eccentric gear for operating said valve.

4. The combination with a vehicle having a rear axle, rear supporting wheels, a body frame and front supporting wheels, of a steam engine located within and upon said rear axle, the piston cylinder of said engine being contained within said axle, said engine being geared to one of said rear wheels, a steam generator positioned near the front end of said frame, means for conducting live steam from said generator to said engine, a second engine positioned on said frame forward of said rear axle, said second engine being geared to one of said front wheels, and means for conducting exhaust steam from said first engine to said second engine for operating the same.

5. The combination with a vehicle having a rear axle rear supporting wheels a body frame and front supporting wheels, of two reciprocating steam engines carried by said rear axle and geared to the opposite rear supporting wheels respectively, a steam turbine mounted on said frame, said turbine being adapted to be geared to one of said front supporting wheels, a steam generator carried by said vehicle, means for conducting live steam from said generator to each of said first two engines, means for conveying exhaust steam from either or both of said first two engines to said turbine, and a throttle valve for governing the flow of steam from said generator to the said first two engines.

In testimony whereof, I hereunto affix my signature, in presence of two witnesses.

JOHN G. BARNSDALE.

Witnesses:
E. L. FOGORTY,
E. E. RINGDAHL.